United States Patent
Kesar et al.

(10) Patent No.: US 9,158,026 B2
(45) Date of Patent: Oct. 13, 2015

(54) UNDERGROUND CAVITY DETECTION BY ELECTROMAGNETIC SHOCK WAVES

(75) Inventors: Amit Kesar, Ramat Gan (IL); Boris Ginzburg, Rehovot (IL)

(73) Assignee: Soreq Nuclear Research Center, Nahal Soreq, Yavne (IL)

( * ) Notice: Subject to any disclaimer, the term of this patent is extended or adjusted under 35 U.S.C. 154(b) by 435 days.

(21) Appl. No.: 13/520,370

(22) PCT Filed: Jan. 4, 2011

(86) PCT No.: PCT/US2011/020072
§ 371 (c)(1),
(2), (4) Date: Jul. 18, 2012

(87) PCT Pub. No.: WO2011/082410
PCT Pub. Date: Jul. 7, 2011

(65) Prior Publication Data
US 2012/0274330 A1    Nov. 1, 2012

Related U.S. Application Data

(60) Provisional application No. 61/291,973, filed on Jan. 4, 2010.

(51) Int. Cl.
G01V 3/30    (2006.01)
G01S 13/04   (2006.01)
G01S 13/88   (2006.01)

(52) U.S. Cl.
CPC . *G01V 3/30* (2013.01); *G01S 13/04* (2013.01); *G01S 13/88* (2013.01)

(58) Field of Classification Search
CPC ........................................ G01V 3/30
USPC .......................................... 324/338
See application file for complete search history.

(56) References Cited

U.S. PATENT DOCUMENTS

| 3,286,163 | A  | * | 11/1966 | Holser et al. ............... 324/338 |
| 4,161,687 | A  |   | 7/1979  | Lytle |
| 6,271,754 | B1 |   | 8/2001  | Durtler |
| 2007/0152817 | A1 | | 7/2007 | Nishigaki |
| 2010/0013497 | A1 | | 1/2010 | Evans |

OTHER PUBLICATIONS

Sato Motoyuki et al., "Analysis of a Borehole Radar in Cross-hole Mode", IEEE Transactions on Geoscience and Remote Sensing, IEEE Service Center, Piscataway, N J, US, vo. 29, No. 6, Nov. 1, 1991, pp. 899-904.*

PCT Search Report PCT/US2011/020072, mailing date May 10, 2012.

Sato Motoyuki et al., "Analysis of a Borehole Radar in Cross-hole Mode", IEEE Transactions on Geoscience and Remote Sensing, IEEE Service Center, Piscataway, NJ, US, vo. 29, No. 6, Nov. 1, 1991, pp. 899-904.

\* cited by examiner

*Primary Examiner* — Reena Aurora
(74) *Attorney, Agent, or Firm* — Dekel Patent Ltd.; David Klein

(57) ABSTRACT

A method for detection of underground anomalies including in a system of distributed antennas (10), which are leaky transmission lines, disposed in 16 boreholes (12) formed in a ground, a transmitter (14) being connected to one of the antennas (10), and a receiver (16) being connected to another of the antennas (10), injecting an electromagnetic pulse into one of the antennas (10), wherein the pulse gradually leaks out, and wherein if a speed of propagation in the line in which the pulse is injected is faster than a speed of propagation in the ground, a shock wave is transmitted through the ground, called a transmitted signal, and received as a received signal at another of the antennas (10), and wherein an underground anomaly diffracts the shock wave, resulting in a detectable disturbance in the received signal, and locating the anomaly as a function of a time delay of the disturbance relative to the transmitted signal.

7 Claims, 2 Drawing Sheets

Perfectly Matched Layer (PML)

UNDERGROUND CAVITY DETECTION BY ELECTROMAGNETIC SHOCK WAVES

CROSS-REFERENCE TO RELATED APPLICATIONS

This application is a national phase application of PCT patent application PCT/US11/020072, filed 4 Jan. 2011, which claims priority under 35 USC §119 to U.S. Provisional Patent Application Ser. No. 61/291,973, filed 4 Jan. 2010, which are incorporated herein by reference.

FIELD OF THE INVENTION

This invention relates generally to detection by electromagnetic (EM) waves of an underground anomaly such as a cavity, pipe, or any material bulk which differs from its surround by its EM properties. More particularly, the invention relates to underground detection by EM waves transmitted and received via boreholes.

BACKGROUND OF THE INVENTION

Detection and ranging of underground anomalies is important for a variety of applications, such as detecting underground cavities, unmapped infrastructure pipelines, and ores. The magnetic method measures anomalies with respect to the earth magnetic field. This method, however, is sensitive to ferromagnetic bodies only. The acoustic method uses sound waves transmitted through the ground and is sensitive to the contrast in acoustic impedance of the anomaly. The EM method uses radio waves and is therefore sensitive to the difference in the EM impedances of the anomaly and surrounding media.

A common EM technique is the ground penetration radar (GPR) in which the transmission and reception of waves is performed from above the ground. This method, however, has limited penetration ability in a ground with high conductivity. In order to increase the depth of penetration, lower frequencies, which suffer less from attenuation, have to be used. However, low frequencies result in low resolution. Typical attenuation factors could be from 1 dB/m to tens of dB/m.

Another EM technique uses radiation from one borehole to another. This method has the same disadvantage of penetration vs. resolution. However, since the signal travels one way (and not into the ground and back as in the GPR method), the penetration vs. resolution is better tolerated. Another advantage of the borehole measurement compared to the GPR is that transmitting and receiving the signal from underneath the ground can reduce the man-made noise level, thereby achieving better performance.

Both methods can be used to create an image of the ground. The GPR can be moved along a path above the ground in order to generate a synthetic aperture image. A cross-section image can be made between the two boreholes by tomographic reconstruction, as described in U.S. Pat. Nos. 5,185,578 and 4,742,305 to Stolarczyk et al. This method requires scanning the locations of the transmitter and the receiver along their boreholes, respectively. This scan is typically done mechanically and takes a long time to complete.

The present invention is most relevant to the borehole tomography technique. The invention exploits the phenomenon that when an EM pulse is injected into a leaky transmission line placed along a dielectric bulk, an EM shock wave will be radiated inside the dielectric bulk, if the signal velocity inside the line is faster than the phase velocity in the dielectric bulk. This radiation is similar to Cerenkov radiation. See D. Grischkowsky, I. N. Duling, III, J. C. Chen, and C.-C. Chi, "Electromagnetic shock waves from transmission lines", Physical Review Letters, vol 59, pp. 1663-1666 (1987).

SUMMARY OF THE INVENTION

The present invention seeks to provide improved underground detection by EM waves transmitted and received via boreholes, as is described further in detail hereinbelow.

In accordance with a non-limiting embodiment of the invention, a distributed antenna, also known as a leaky transmission line, is placed along each borehole. A transmitter is connected to one of the distributed antennas and a receiver is connected to the other distributed antenna. The transmission lines are designed in such a way that the phase velocity of the signal along each line is faster than the phase velocity through the ground. This can be done, for example, by a line filled with dielectric material in which its permittivity is less than the ground permittivity.

When a pulse is injected to the leaky transmission line, the pulse will leak while propagating through the line, and radiate a Cerenkov-like EM shock wave cone into the ground. A signal detector, connected to the transmission line at the other borehole will receive the shock wave after the shock wave has passed through the ground. If a disturbance, such as an air-cavity or a metallic pipeline or any other object, is located between the two boreholes, the shock wave will be diffracted by the disturbance and the signal at the receiving line will have an anomaly depending on the location of the object.

The object location is correlated to the time delay that takes the signal to pass from the transmitter through the leaky transmission line, through ground and the object, to the receiving line, and into the receiver. The object location may be accurately determined by an intersection of two such signals.

This method has the following advantages over the conventional borehole tomography:

1. No need for mechanically moving the transmitter and receiver down the boreholes. This method saves operational time because the localization is implemented based on the time the signal is received.

2. Similar to the above, the method can be used to operate continuously (e.g., in pulse-repeated mode), in order to detect underground changes in real time.

3. The system of the invention has better directionality, because the shock wave produced by the distributed long line antenna propagates conically whereas a wave from a lumped antenna propagates spherically. This can provide a longer distance of penetration.

Compared to methods in which at least part of the system is underground, the present invention employs simple passive hardware beneath the ground (just a transmission line), thereby having increased reliability and survivability, being simpler to maintain, and requiring a small diameter of the boreholes.

The following is a non-limited list of features of the present invention:

Two distributed antennas are placed in boreholes. One transmits a signal and has a transmitter connected to one of its ends, and one receives a signal and has a receiver connected to one of its ends. An electromagnetic pulse is injected into one of the lines. The pulse gradually leaks out. If the speed of propagation in the line is faster than speed of propagation in the ground, a shock wave will be transmitted in the ground. The shock wave will be received in the other line.

More than two distributed antennas, each one in its borehole, are used. At any moment only one antenna is used as a transmitter while all the others serve as receivers. The functions of receiver/transmitter may be switched between antennas in the course of the work.

The transmitter and receiver are connected to the line(s). A set of switches may connect the transmitter or receiver to either ends of the line(s). The transmitter and receiver can switch places. The system can have a horizontal configuration instead of a vertical configuration, or any other path (e.g., slanted) beneath the ground. Alternatively, one cable may be beneath the ground and the other may be above the ground.

Electromagnetic pulses are represented (composed and decomposed) by another set of signals, such as with a Fourier method. Thus, the transmitter, for example, can transmit frequency modulated signals and the receiver can distinguish these frequencies and then build the equivalent to a single pulse.

The ends of the cables may be open/short/matched/or any other impedance in order to control the reflection from the other end.

BRIEF DESCRIPTION OF THE DRAWINGS

The present invention will be understood and appreciated more fully from the following detailed description, taken in conjunction with the drawings in which.

DETAILED DESCRIPTION OF EMBODIMENTS

Figure 1:
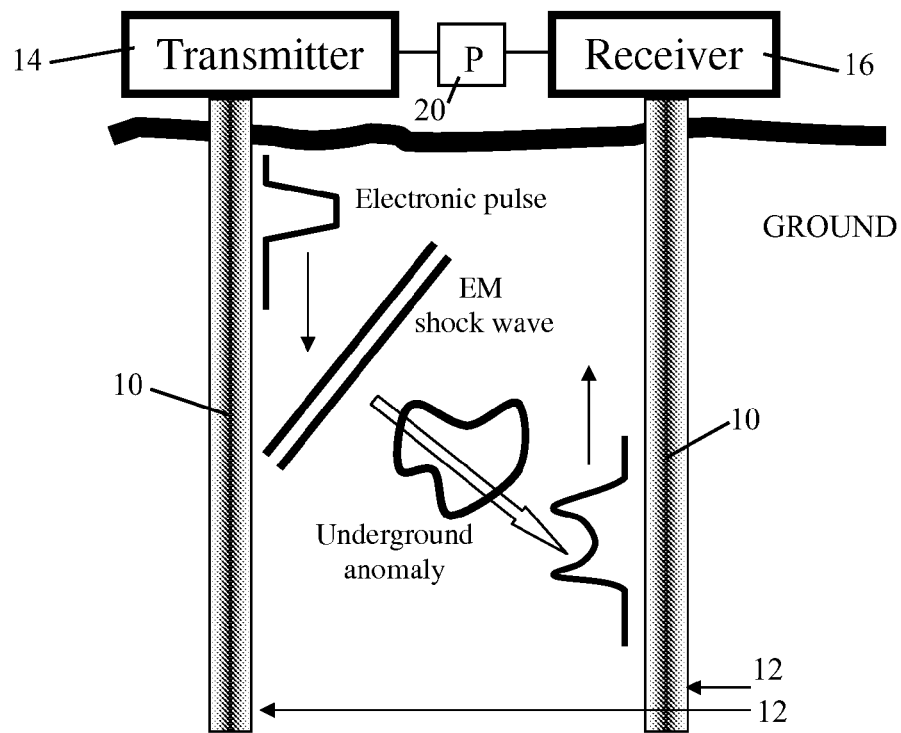
FIG. 1 is a simplified sectional illustration of a system for detection of underground anomalies underneath or in the ground, including two boreholes extending to a depth into the ground, in accordance with an embodiment of the present invention.

Reference is now made to FIG. 1, which illustrates a system for detection of underground anomalies underneath or in the ground, including two boreholes extending to a depth into the ground, in accordance with an embodiment of the present invention. The invention shortens the time-consuming procedure of localizing underground anomalies by the borehole tomography method.

A distributed antenna 10 (also called a leaky transmission line 10) is inserted into each borehole 12. A transmitter 14 is connected to one of the distributed antennas 10 and a receiver 16 is connected to the other distributed antenna 10. The transmitter 14 generates an electronic pulse that propagates through the line (antenna 10). The signal leaks outside of antenna 10 while propagating. The line is chosen with dielectric and magnetic constants smaller than those of the ground and therefore the speed of electromagnetic wave propagation through the line is faster than the speed of propagation through the ground. Thus, a shock wave is built along the line while the pulse propagates along it. This shock wave propagates conically, scans the ground, and part of it couples to the other transmission line. A signal will appear at the receiver 16. If the ground has a disturbance (anomaly) between the two boreholes, the shockwave will diffract on it and the received signal will have a signature which is correlated to the shape and location of the disturbance. A processor 20 locates the anomaly as a function of a time delay of the disturbance relative to the transmitted signal.

Figure 2:
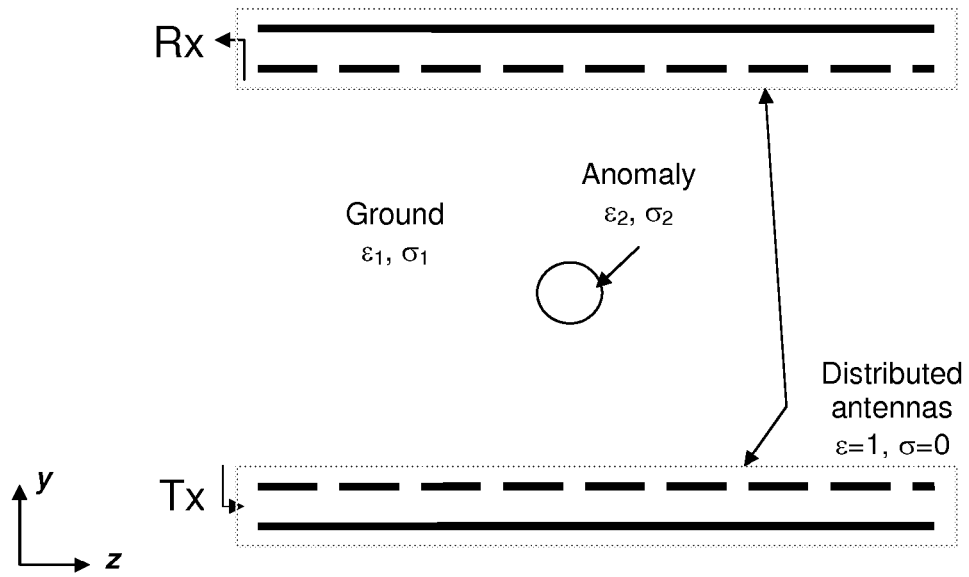
FIG. 2 is a simplified illustration of a two-dimensional model for simulating the system of FIG. 1 by the finite-difference time-domain method, in accordance with an embodiment of the present invention.

FIG. 2 shows a two-dimensional model for simulating this idea by the finite-difference time-domain method. The z dimension is down into the ground. The distributed antennas are represented by a parallel-plate transmission line, wherein one of the plates in each line has coupling holes along it. The distance between the coupling-holes (with respect to the speed of propagation) should be shorter than the pulse rise- and fall-time. The pulse is injected at the left end of the lower line, marked as Tx. The received pulse is measured at the left end of the upper line. The line in this illustration is filled with air, i.e., relative permittivity and permeability are equal to unity. The ground and anomaly are represented by different electromagnetic properties and may include conductivity losses as well. The boundary of the calculation space is formulated by the perfectly matched layer method (well known in the field of wave equations, especially for Maxwell's Equations) in order to absorb the waves outside of the two line region.

Figure 3:
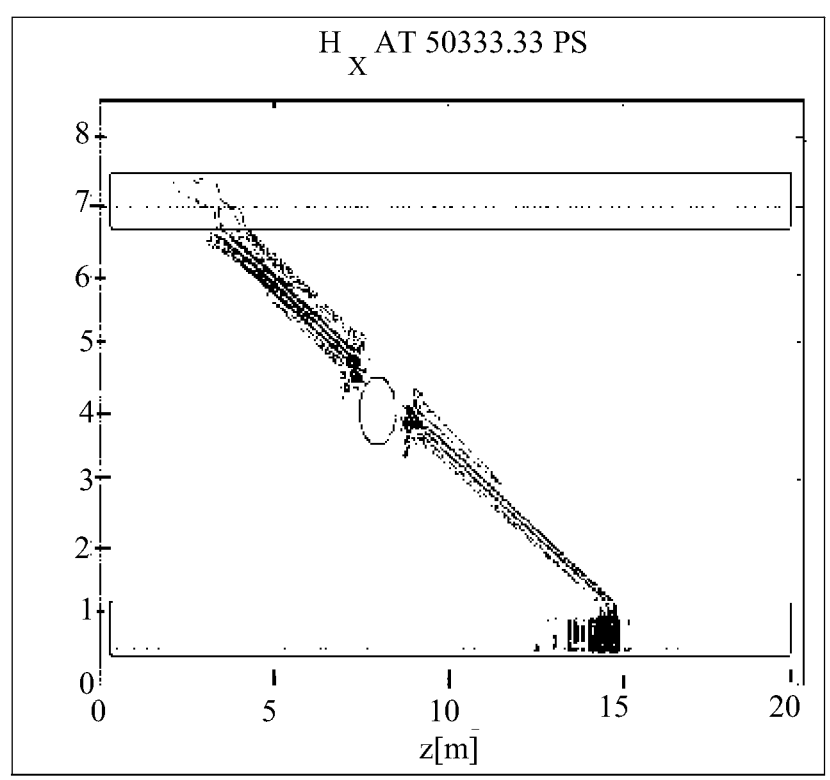
FIG. 3 is a simplified illustration of a shock wave that develops along the transmitting line when an electric pulse is applied to it, in accordance with an embodiment of the present invention.

FIG. 3 shows the shock wave that develops along the transmitting line when an electric pulse is applied to it. This wave diffracts by the anomaly, represented by the circular shape at z=8 and y=4.

The finite-difference time domain method was used to obtain this simulation. The method is based on discretization of Maxwell's Equations in time and space.

It is appreciated that various features of the invention which are, for clarity, described in the contexts of separate embodiments, may also be provided in combination in a single embodiment. Conversely, various features of the invention which are, for brevity, described in the context of a single embodiment, may also be provided separately or in any suitable subcombination.

What is claimed is:

1. A method for detection of underground anomalies comprising:
    placing an electromagnetic wave transmitter connected to an antenna in a first borehole in a ground;
    placing an electromagnetic wave receiver connected to an antenna in a second borehole, both antennas for the transmitter and the receiver comprising leaky transmission lines;
    selecting dielectric and magnetic constants of said leaky transmission lines to be smaller than those of the ground so that a speed of electromagnetic wave propagation through said leaky transmission lines is faster than a speed of propagation through the ground;
    injecting an electromagnetic pulse into one of the antennas, wherein the pulse gradually leaks out as a shock wave which is received as a received signal at another of the antennas, and wherein an underground anomaly diffracts the shock wave, resulting in a detectable disturbance in the received signal; and
    locating said anomaly as a function of a time delay of the disturbance relative to the transmitted signal.

2. The method according to claim 1, wherein said received signal has a signature which is correlated to a shape and location of the disturbance.

3. The method according to claim 1, wherein the step of selecting comprises filling said leaky transmission lines with dielectric material whose permittivity is less than the ground permittivity.

4. The method according to claim 1, further comprising switching functions of receiving and transmitting between said antennas.

5. A system for detection of underground anomalies comprising:
- an electromagnetic wave transmitter connected to an antenna placed in a first borehole in a ground;
- an electromagnetic wave receiver connected to an antenna placed in a second borehole, both antennas for the transmitter and the receiver comprising leaky transmission lines;
- wherein dielectric and magnetic constants of said leaky transmission lines are smaller than those of the ground so that a speed of electromagnetic wave propagation through said leaky transmission lines is faster than a speed of propagation through the ground;
- and wherein when an electromagnetic pulse is injected into one of the antennas, the pulse gradually leaking out as a shock wave which is received as a received signal at another of the antennas, and wherein an underground anomaly diffracts the shock wave, resulting in a detectable disturbance in the received signal; and
- a processor operative to locate said anomaly as a function of a time delay of the disturbance relative to the transmitted signal.

6. The system according to claim 5, wherein said received signal has a signature which said processor correlates to a shape and location of the disturbance.

7. The system according to claim 5, wherein there are more than two of said distributed antennas in boreholes, wherein at any moment only one of the antennas transmits a signal while the others serve as receivers.

\* \* \* \* \*